United States Patent [19]
Goodfellow

[11] Patent Number: 5,340,051
[45] Date of Patent: Aug. 23, 1994

[54] WOUND SPOOL OF WEB MATERIAL

[75] Inventor: Alan G. Goodfellow, Rochester, N.Y.

[73] Assignee: Eastman Kodak Company, Rochester, N.Y.

[21] Appl. No.: 897,679

[22] Filed: Jun. 12, 1992

[51] Int. Cl.⁵ ............................................. B65H 75/18
[52] U.S. Cl. .............................. 242/348.1; 242/583; 242/613.1
[58] Field of Search ............... 242/71, 71.1, 71.2, 242/71.3, 71.4, 71.5, 71.6, 71.7, 71.8, 74; 354/275

[56] References Cited

U.S. PATENT DOCUMENTS

| | | | |
|---|---|---|---|
| 1,672,510 | 6/1928 | Williams . | |
| 1,930,144 | 10/1933 | Lee | 242/74 |
| 2,017,160 | 10/1935 | Parker | 242/71 |
| 2,019,672 | 11/1935 | Goodhand | 206/52 |
| 2,182,398 | 12/1939 | Gantnier | 242/74 |
| 2,362,577 | 11/1944 | Mihalvi et al. | 242/71.8 |
| 2,541,476 | 2/1951 | Mihalyi | 242/71.1 |
| 2,729,401 | 1/1956 | Italiano | 242/71.1 |
| 3,021,085 | 2/1962 | Freer | 242/74 |
| 3,300,156 | 1/1967 | Tucker et al. | 242/74.1 |
| 3,361,380 | 1/1968 | Mizutani | 242/74 |
| 3,485,690 | 12/1969 | Kozai | 156/73 |
| 4,225,097 | 9/1980 | Ohtomo | 242/55.01 |
| 4,506,843 | 3/1985 | Lührig et al. | 242/74 |
| 4,834,310 | 5/1989 | Ikariya et al. | 242/74 |
| 4,846,418 | 7/1989 | Fairman | 242/71.1 |
| 4,852,821 | 8/1989 | Harris et al. | 242/71.8 |
| 4,978,084 | 12/1990 | Harris et al. | 242/74 |
| 5,004,176 | 4/1991 | Niedospial | 242/71.8 X |
| 5,031,853 | 7/1991 | Jensen | 242/71.1 |

FOREIGN PATENT DOCUMENTS 53312  6/1982  European Pat. Off. ............ 242/71.1

Primary Examiner—Daniel P. Stodola
Assistant Examiner—Eileen A. Dunn
Attorney, Agent, or Firm—Charles E. Snee, III

[57] ABSTRACT

A wound spool (10) of film strip (24) of the type having a full width portion ($26_b$), a reduced width lead end (26) and a transition portion ($26_a$) extending between the full width and reduced width portions, the spool including a core (12,14) to which the lead end is attached, a pair of radially extended end flanges (18) at respective opposite ends of the core and a pair of circumferentially and axially extended shoulders (16) between the end flanges and the core for supporting the longitudinally extending edges of the full width portion. Each of the shoulders has an axially extended, essentially cylindrical portion ($16_b$) adjacent a respective one of the end flanges for supporting one of the edges of the full width portion; an axially extended frusto-conical portion ($16_a$) extended from the cylindrical portion toward the core for supporting the edges of the transition portion; the length ($l_2$) of the core between the frusto-conical portions and the diameter ($d_1$) of the core being sufficient for winding the lead end about the core between the shoulders; and the axial length ($l_3$) and cone angle ($\phi$) of the frusto-conical portions being sufficient for winding the transition portion about the frusto-conical portions and for radially spacing the full width portion from contact with the lead end and with a strip of tape (22) attaching the lead end to the core.

3 Claims, 3 Drawing Sheets

WOUND SPOOL OF WEB MATERIAL

TECHNICAL FIELD

The invention concerns spools for strips of web material. More particularly, the spool according to the invention is suited for web materials such as photographic films which have a lead end suitably attached to the core of the spool.

BACKGROUND ART

When winding strips of web materials onto spools, a common practice has been to attach the lead end of the strip to the core of the spool by means such as a strip of tape between the lead end and the core or by means of a mechanical engagement between the lead end and the core. For many types of web materials, contact with the strip of tape or deformations in the web due to the mechanical engagement can cause the first few convolutions of the web material to be deformed slightly and to exhibit pressure marks. These marks may be so prominent as to be unsightly for some web materials, but may also be quite subtle in appearance. Where the web material is photographic film, such pressure marks have long been known to cause defects in the images produced in the film over the first few convolutions, an unacceptable situation for photographers. Contact with the tape can also cause abrasion marks and transfer of dirt from the tape to the photographic film, each of which can lead to irregularities in the processed film.

Various techniques have been tried to space the second convolution of a strip of web material from the underlying strip of tape or deformation of the first convolution, in order to reduce pressure marking, abrasion and transfer of dirt. U.S. Pat. No. 1,672,510 shows a spindle for winding a strip of gelatin in which the center of the spindle has a reduced diameter portion to permit winding of a narrow leader for the strip without creating a bulge in the successive convolutions of the strip. U.S. Pat. No. 1,930,144 shows a spool for photographic film in which the ends of the core of the spool are provided with axially extending shoulders between which a reduced diameter portion is formed for receiving at least a portion of the first convolution of film.

While spindles or spools of these general types have been widely used, the advent of more pressure sensitive web materials, such as certain state of the art photographic films, has brought a need for spools or lead end geometries, or both, which are configured to further minimize any tendency to produce pressure marks. This is because the light sensitive emulsions used in modern photographic films are susceptible to pressure marking due to smaller deformations and slighter pressures than could be withstood by previous films.

SUMMARY OF THE INVENTION

A wound spool in accordance with the invention includes a film strip of the type having a full width portion, a reduced width lead end portion and a transition portion extending between the full width and reduced width portions. The spool includes a core to which the lead end is attached, a pair of radially extended end flanges at respective opposite ends of the core and a pair of circumferentially and axially extended shoulders between the end flanges and the core for supporting the longitudinally extending edges of the full width portion. In accordance with the improvement of the invention, each of the shoulders comprises an axially extended frusto-conical portion extended toward the core for supporting the edges of the transition portion. Preferably, each of the shoulders also comprises an axially extended, essentially cylindrical portion adjacent a respective one of the end flanges, the frusto-conical portion extending from the cylindrical portion. The length of the core between the frusto-conical portions and the diameter of the core are sufficient for winding the lead end about the core between the shoulders; and the axial length and cone angle of the frusto-conical portions are sufficient for guiding the transition portion partially around the frusto-conical portions and for radially spacing the full width portion from contact with the lead end and thereby preventing contact which could lead to pressure marking, abrading or transferring of dirt. Although straight sided frusto-conical portions are preferred, the use of radially inwardly or outwardly curved, essentially frusto-conical portions is also within the scope of the invention; so long as the shape of the shoulder permits the transition portion to space the full width portion from contact with the lead end. The lead end may be attached to the core by a strip of tape extending around the core between the shoulders and engaging both sides of the lead end, in which case the axial length and cone angle are chosen to be sufficient for radially spacing the full width portion from contact with the strip of tape. The use of other means of attachment for the lead end is also within the scope of the invention.

DESCRIPTION OF THE PREFERRED EMBODIMENTS

Figure 1:
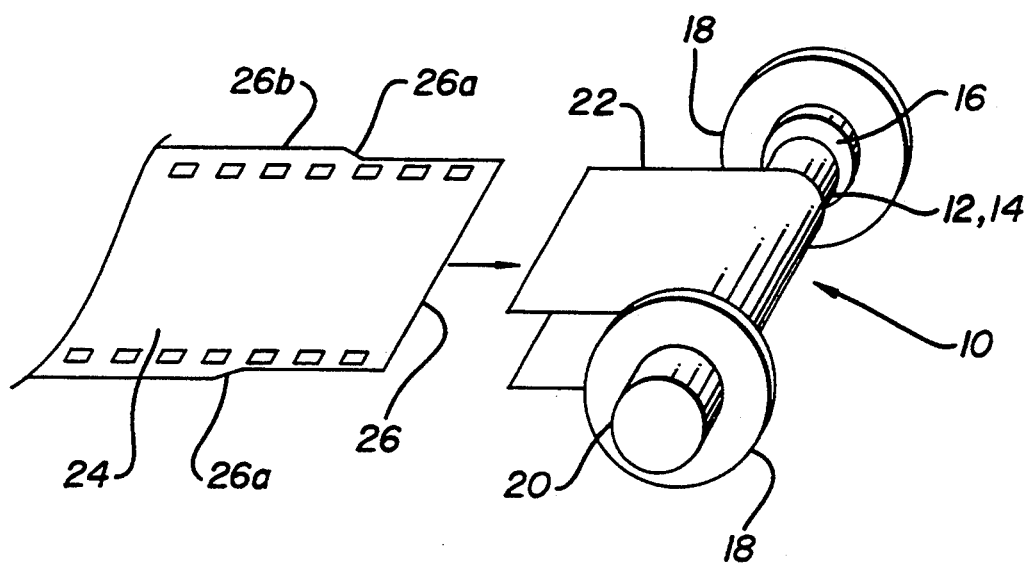
FIG. 1 shows a perspective view of a spool with a strip of tape wrapped partially around the core and the lead end of a strip of photographic film being inserted between the ends of the strip of tape.

The following is a detailed description of the preferred embodiments of the invention, reference being made to the drawings in which the same reference numerals identify the same elements of structure in each of the several Figures.

Figure 2:
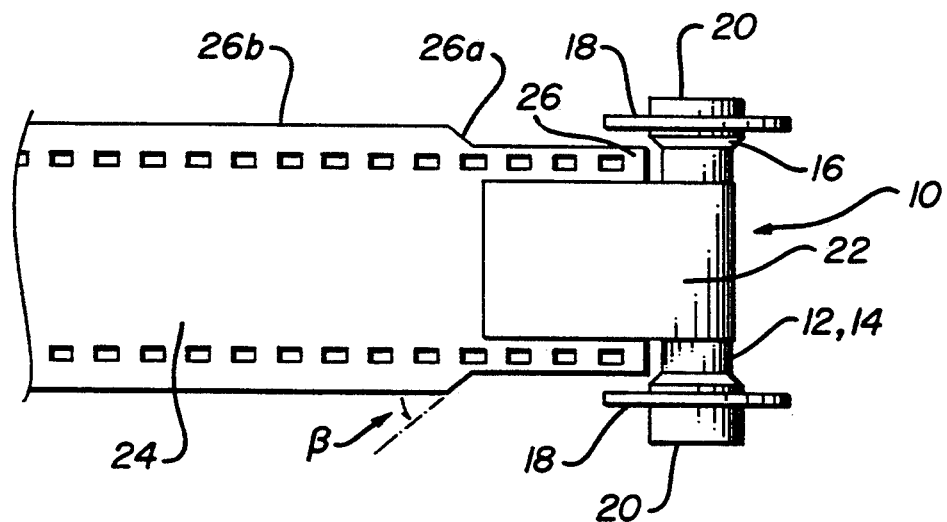
FIG. 2 shows a view of a spool with the lead end of a strip of photographic film attached by a strip of tape and illustrates the lead end, transition and full width portions of the strip of film.

FIGS. 1 and 2 illustrate schematically how a spool 10 according to the invention may be attached to the lead end of a strip of web material such as photographic film. Spool 10 may be injection molded from a suitable plastics material or manufactured in accordance with any other process and from any suitable material. In the typical manner as further illustrated in FIGS. 3 and 4, spool 10 comprises an essentially cylindrical central core 12 to which the lead end is attached and about which the strip is wound. The axial length $l_1$ of core 12 preferably is only slightly longer than the width of the strip. A central portion 14 of core 12 has a length $l_2$ and diameter $d_1$. At the opposite ends of central portion 14 are circumferentially and axially extended shoulders 16, each of which comprises an axially extended frusto-conical portion $16_a$ having a large diameter $d_2$ near the end of core 12, a smaller diameter $d_1$ at the end of central portion 14, an axial length $l_3$ and a cone angle $\phi$. The smaller diameter of portion $16_a$ may also be somewhat larger than $d_1$ without departing from the scope of the invention. Also, though straight sided frusto-conical portions $16_a$ are preferred, the surface of portions $16_a$ may be curved radially inwardly or outwardly from $d_2$ to $d_1$. Each of shoulders 16 also comprises a circular cylindrical portion $16_b$ outboard of frusto-conical portion $16_a$ portion $16_b$ having a length $l_4$ and functioning to support the marginal edges of the full width portion of the strip, as will be described subsequently. Formed integrally with core 12 adjacent shoulder portion $16_b$ are a pair of radially extended end flanges 18 to prevent telescoping of the strip from core 12. Finally, at each end of spool 10 is formed an axially extended boss or hub 20 which cooperates in the known manner with apparatus for winding a strip onto the spool, with the camera in which a spool of photographic film is used and with apparatus for processing exposed film.

Figure 3:
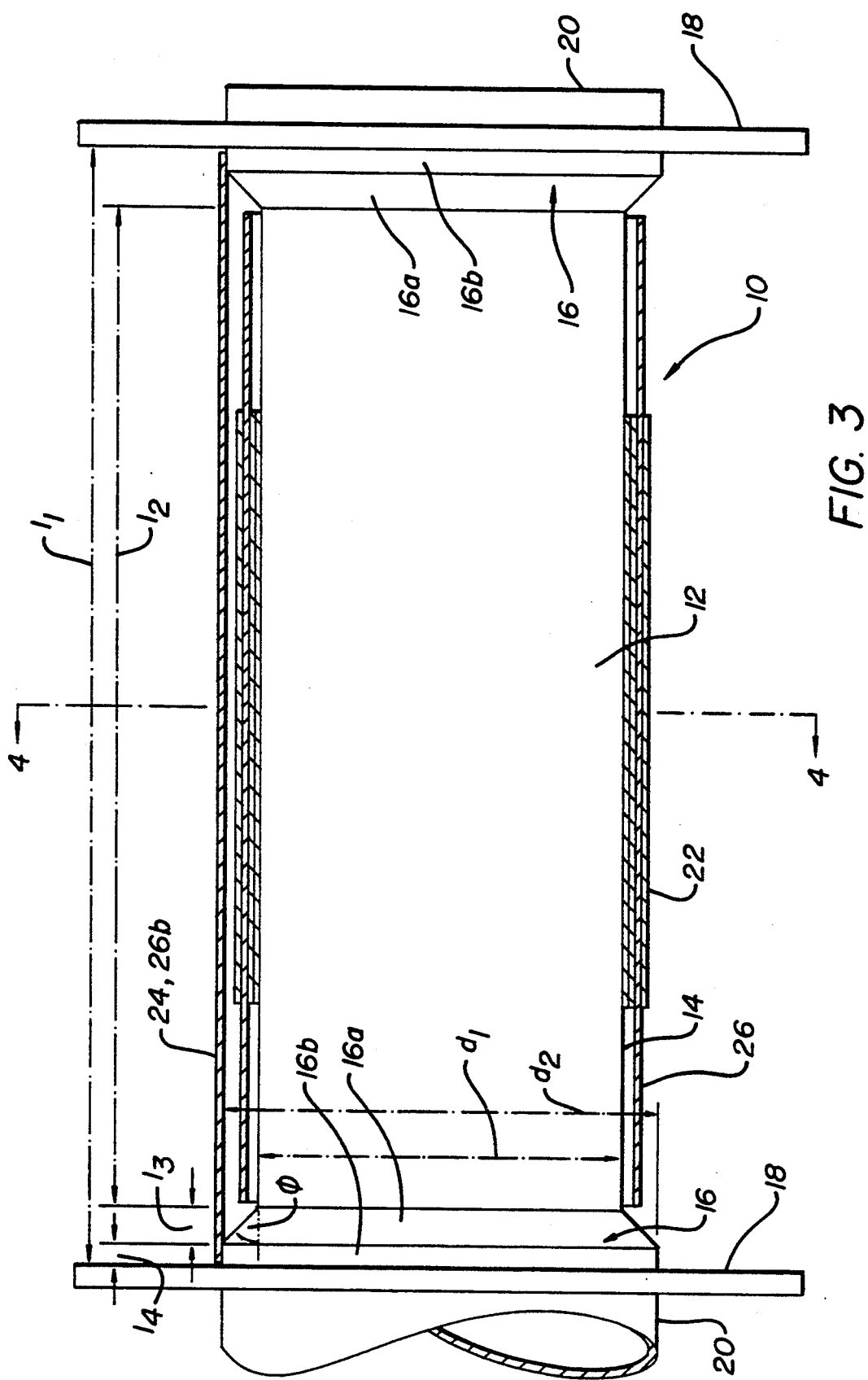
FIG. 3 shows an elevation view, partially in section, of a spool in accordance with the invention with a strip of photographic film attached by a strip of tape, with the first and part of the second convolution wound onto the core, taken along line 3–3 of FIG. 4.
Figure 4:
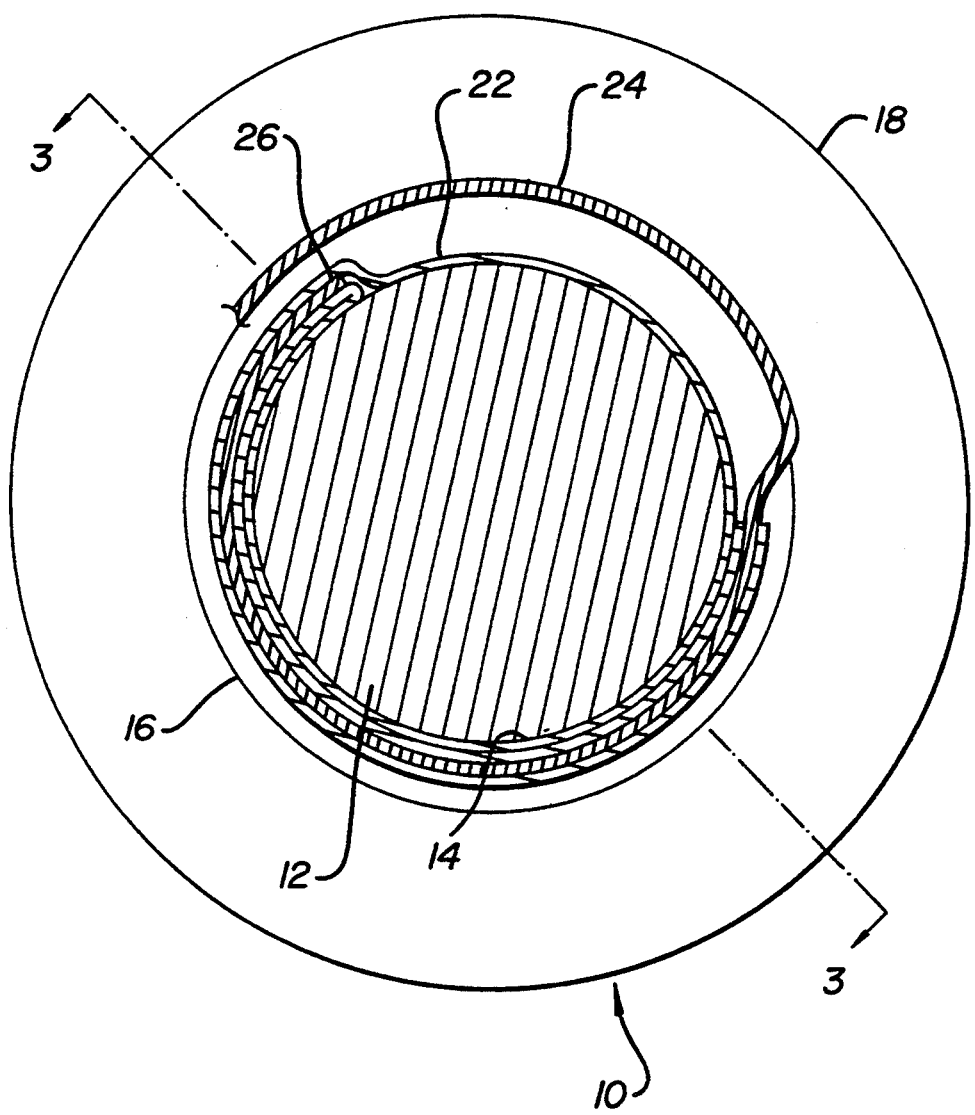
FIG. 4 shows a sectional view of a spool in accordance with the invention, taken along line 4—4 of FIG. 3.

A strip of tape 22 is used in the known manner to attach to spool 10 a strip of web material, such as a strip 24 of photographic film having a reduced width portion or lead end 26. The width of lead end 26 is slightly less than length $l_2$ and its axial length preferably is slightly less than the circumference of core 12. A transition portion $26_a$ extends at an angle $\beta$ from lead end 26 to the full width portion $26_b$ of strip 24. Strip of tape 22 is extended or wrapped more or less symmetrically about core 12 with its free ends projecting radially as shown in FIG. 1, after which lead end 26 is positioned between such free ends; and, using known apparatus, the tape is pressed into engagement with both sides of lead end 26 to complete the attachment. Typically lead end 26 is positioned quite close to core 12 when the tape is pressed into engagement with strip 24. The spool is then rotated to wind strip 24 onto core 12. As the winding proceeds, one of the free ends of strip of tape 22 is folded back on itself. As a result, over a substantial portion of its length the first convolution of tape and film comprises an inner, double thickness of tape; a central, single thickness of film; and an outer, single thickness of tape, as seen in FIGS. 3 and 4. Thus, when the second convolution of film begins, it must pass over a radially outwardly and axially extended step or protrusion formed right at lead end 26. In known types of spools not provided with shoulders 16, $16_a$, $16_b$, contact with this protrusion or with the edges of the tape, or both, can cause deformations in the second convolution and to some extent in successive convolutions, which can lead to unacceptable pressure marking.

In accordance with the invention, angle $\phi$ and length $l_3$, or angle $\beta$ and the widths of lead end 26 and full width portion $26_b$, are chosen to be sufficient for winding transition portions $26_a$ along frusto-conical portions $16_a$ and thereby for radially spacing full width portion $26_b$ from contact with lead end 26. That is, lead end 26 is wound around central portion 14 of core 12; transition portions $26_a$ extend along frusto-conical portions $16_a$; and full width portion $26_b$ is supported along its marginal edges and is fully out of contact with lead end 26 and strip of tape 22.

The invention may be used with web materials of many types. For conventional 35 mm photographic films having a thickness in the range of 0.0127 to 0.0203 mm, diameter $d_1$ preferably should be in the range of 10.74 to 11.00 mm; diameter $d_2$, 12.77 to 13.03 mm; length $l_1$, 35.1 to 35.36 mm; length $l_2$, 32.90 to 33.96 mm; length $l_3$, 0.25 to 0.070 mm; length $l_4$, 0.00 to 0.80 mm; angle $\beta$, 3 to 21°; and angle $\phi$, 21 to 90°.

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. A wound spool of film, comprising:
   a film strip having a full width portion with longitudinally extending edges, a reduced width lead end portion and a transition portion extending between said full width portion and said reduced width portion, said transition portion having edges extended between said lead end portion and said full width portion at acute angles to said longitudinally extending edges of said full width portion; and
   a spool comprising:
   a core to which said lead end portion is attached;
   a pair of radially extended end flanges at respective opposite ends of said core;
   a pair of circumferentially and axially extended shoulders between said end flanges and said core for supporting said longitudinally extending edges of said full width portion, said strip being wound about said core;
   an axially extended frusto-conical portion extended from each said shoulder toward said core for supporting said edges of said transition portion;
   the length of said core between said frusto-conical portions and the diameter of said core being sufficient for winding said lead end portion about said core between said frusto-conical portions; and
   the axial length and cone angle of said frusto-conical portions being sufficient for winding said transition portion about and supporting said edges of said transition portion upon said frusto-conical portions and for radially spacing said full width portion from contact with said lead end portion.

2. A wound spool according to claim 1, wherein said lead end portion is attached to said core by a strip of tape extending around said core between said frusto-conical portions and engaging both sides of said lead end portion, said axial length and cone angle of said frusto-conical portions being sufficient for radially spacing said full width portion from contact with said strip of tape.

3. A wound spool according to claim 1, wherein said acute angle is in the range of 3 to 21 degrees.

* * * * *